United States Patent [19]

Radek

[11] 4,056,194
[45] Nov. 1, 1977

[54] COMBINATION SERVICE TRUCK AND DISPENSING EQUIPMENT

[75] Inventor: John R. Radek, Hinsdale, Ill.

[73] Assignee: Ready Metal Manufacturing Company, Chicago, Ill.

[21] Appl. No.: 632,625

[22] Filed: Nov. 17, 1975

Related U.S. Application Data

[62] Division of Ser. No. 418,835, Nov. 26, 1973, Pat. No. 3,957,159, which is a division of Ser. No. 240,163, March 31, 1972, Pat. No. 3,807,788.

[51] Int. Cl.² .......................... A47F 3/14; A47F 5/14
[52] U.S. Cl. ...................................... 211/131; 211/181; 220/19
[58] Field of Search ................... 211/71, 78, 106, 126, 211/131, 181; 220/18, 19, 334

[56] References Cited

U.S. PATENT DOCUMENTS

| 323,339 | 7/1885 | Kilborn | 220/19 X |
|---|---|---|---|
| 1,635,201 | 7/1927 | Bell et al. | 211/131 |
| 1,977,400 | 10/1934 | Offery et al. | 211/78 |
| 2,678,253 | 5/1954 | Rosenberg | 211/131 X |
| 3,162,462 | 12/1964 | Elders | 211/181 X |
| 3,202,295 | 8/1965 | Drader | 220/19 X |
| 3,641,950 | 2/1972 | Axhamre | 211/165 |

FOREIGN PATENT DOCUMENTS

| 90,752 | 1/1958 | Norway | 211/144 |
|---|---|---|---|
| 493,567 | 10/1938 | United Kingdom | 220/19 |

Primary Examiner—Lawrence J. Staab
Attorney, Agent, or Firm—Frank H. Marks

[57] ABSTRACT

A container especially adapted to hold a plurality of loose articles, comprising bottom, side, back and front walls, at least certain of said walls being reticular to permit visibility of contents from outside the container. Support means for the container extend rearwardly and laterally, providing generally three-point support, and the front wall is hinged to permit quick access to the interior of the container. In preferred embodiments the container is essentially of wire construction and is generally wedge-shaped in horizontal configuration, the support means extending from the periphery of the container at the back and sides thereof, and the front wall being hinged at the bottom thereof to permit dropping of the front wall, with means latching said front wall in closed position.

4 Claims, 17 Drawing Figures

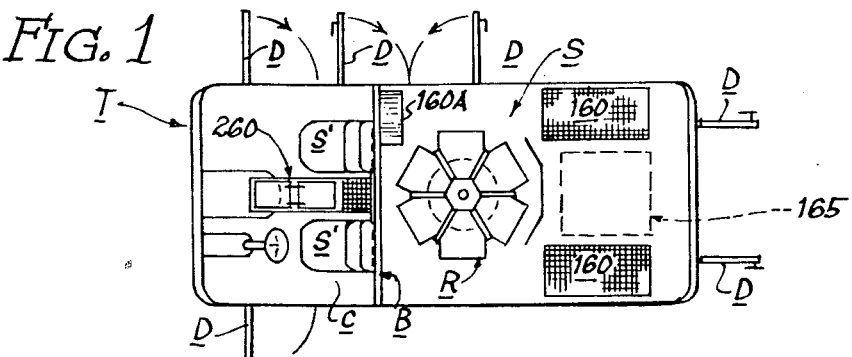
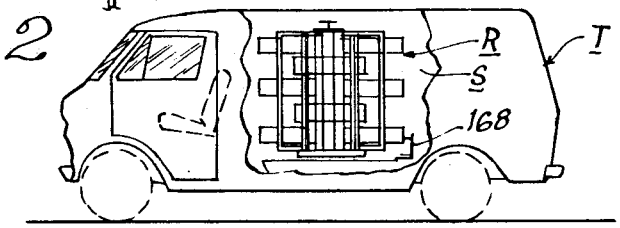
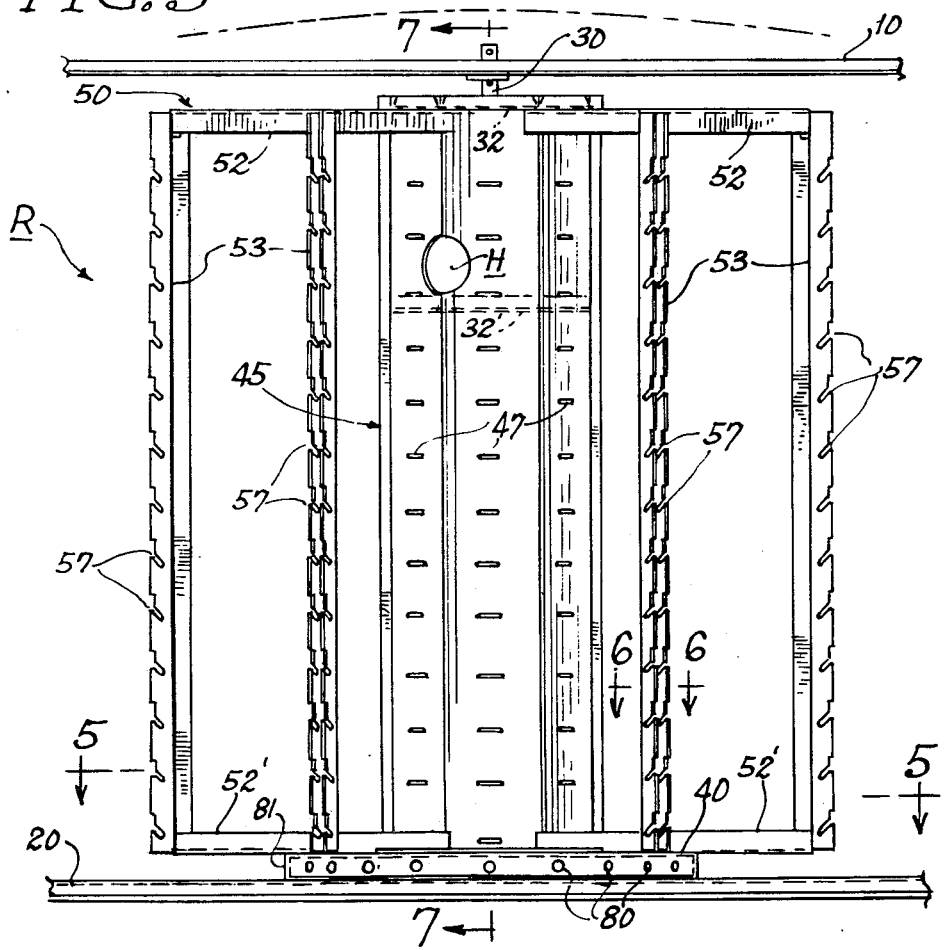

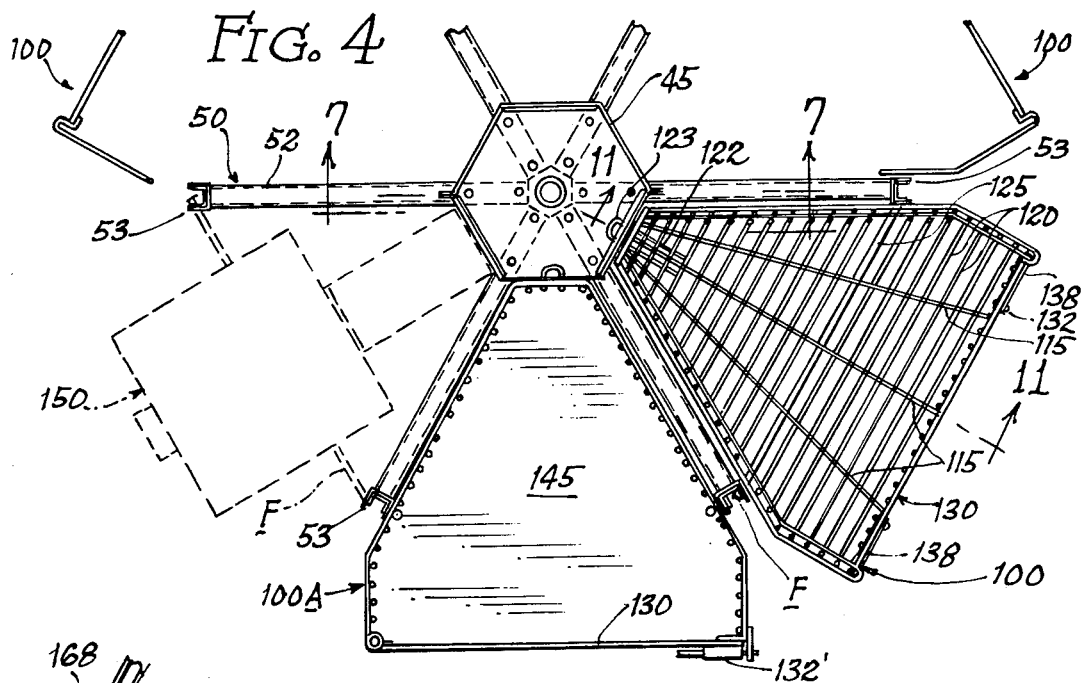
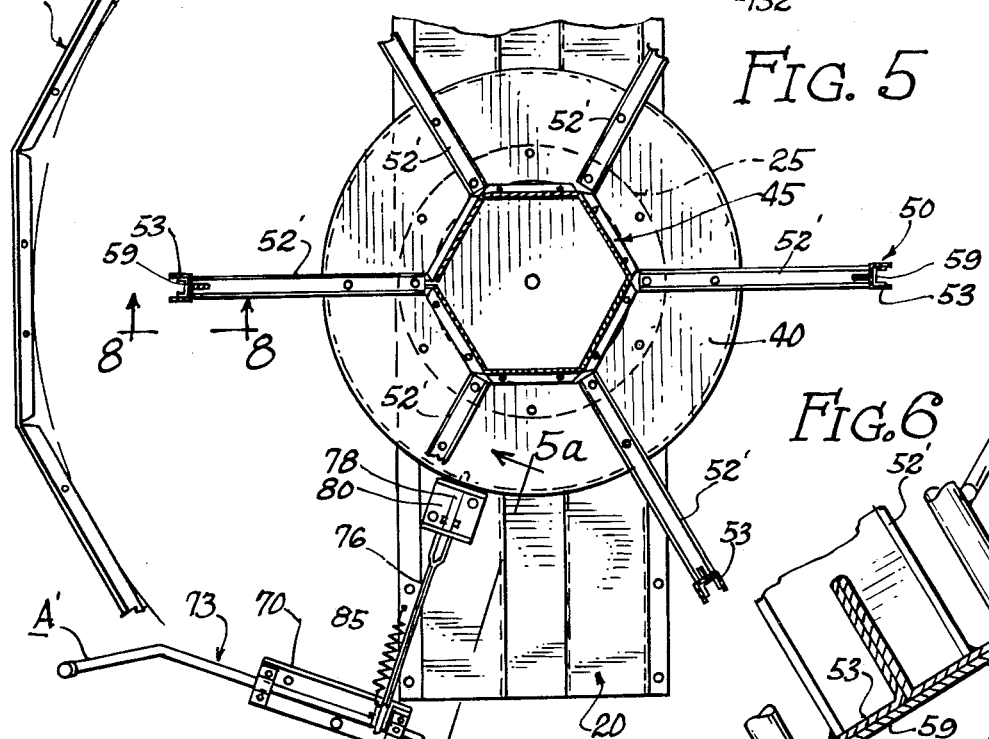
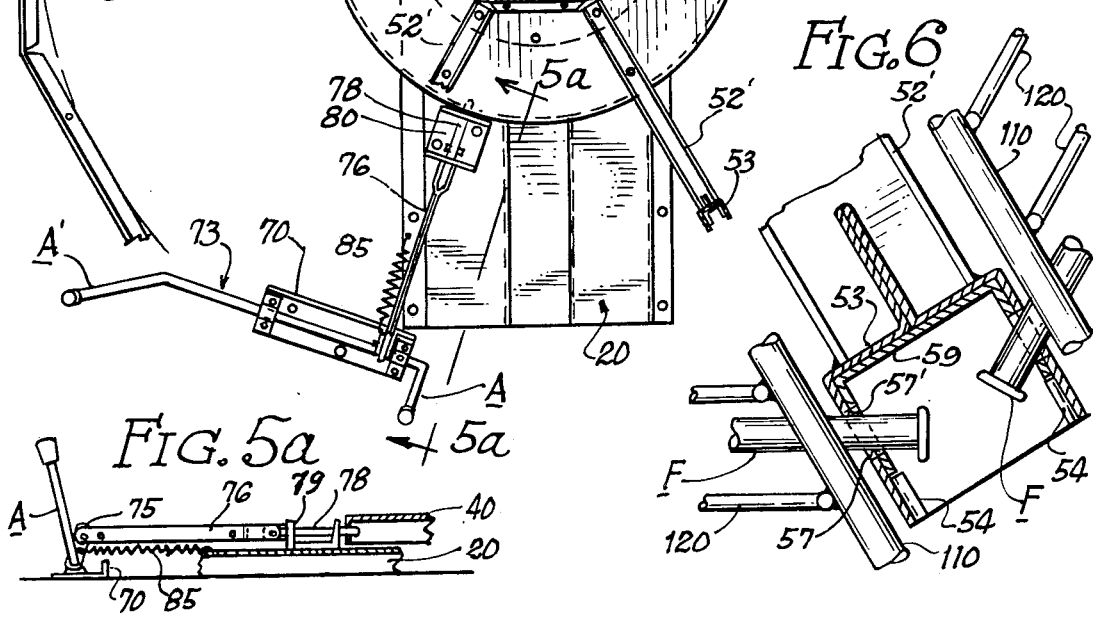

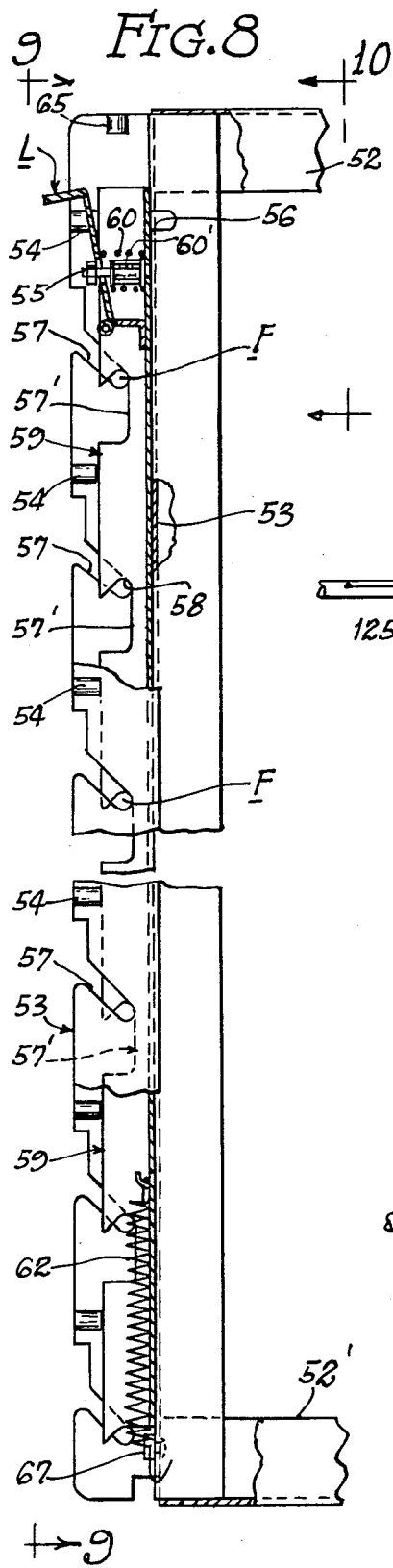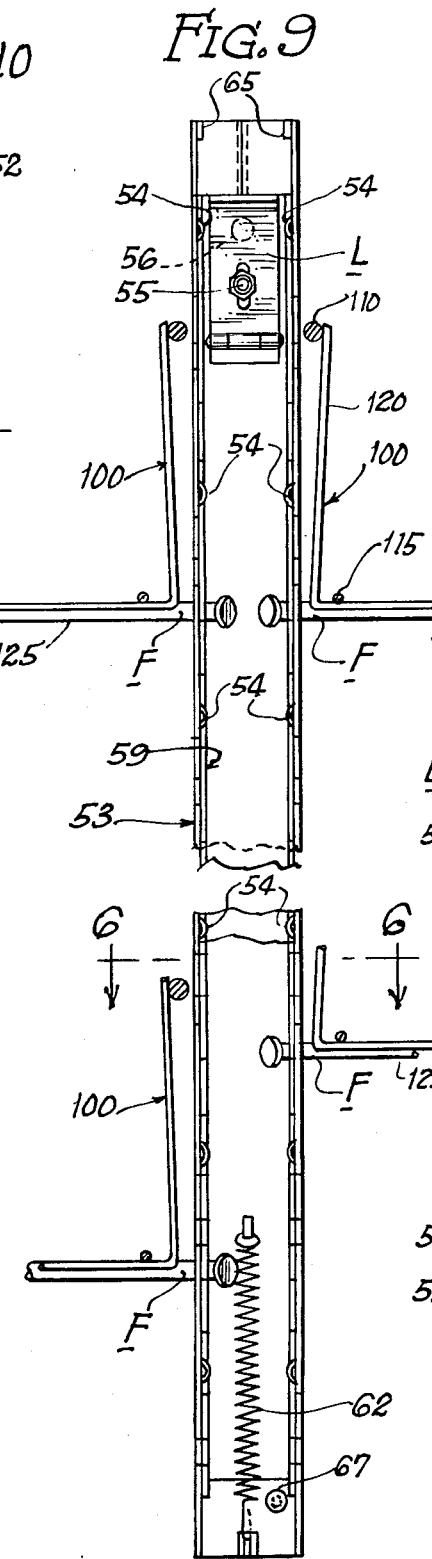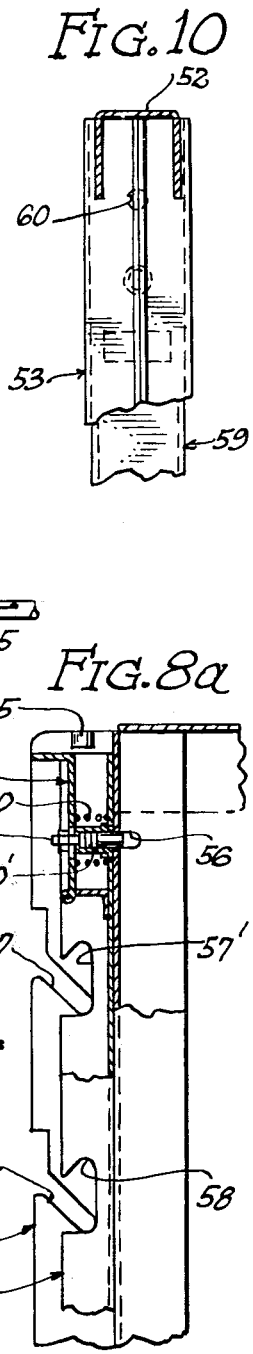

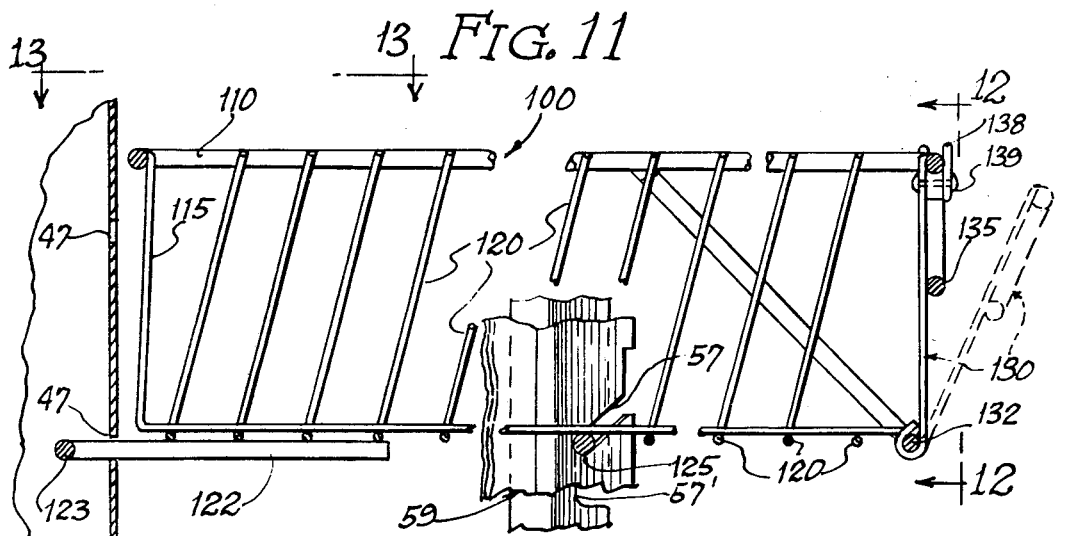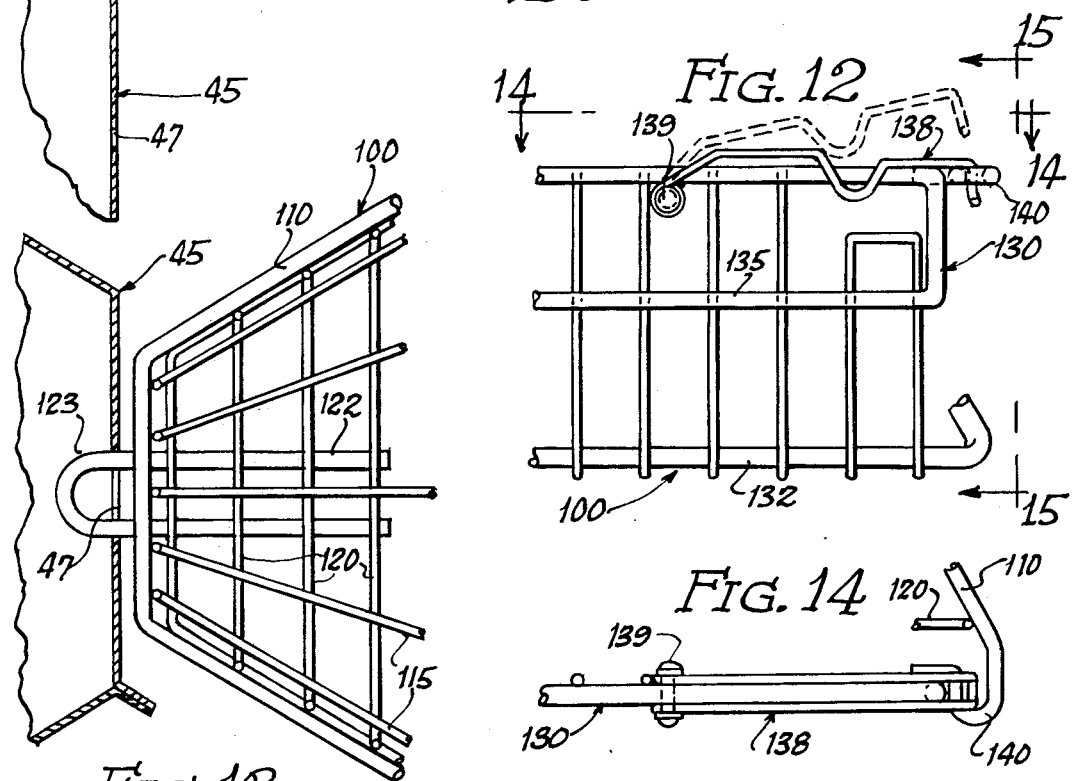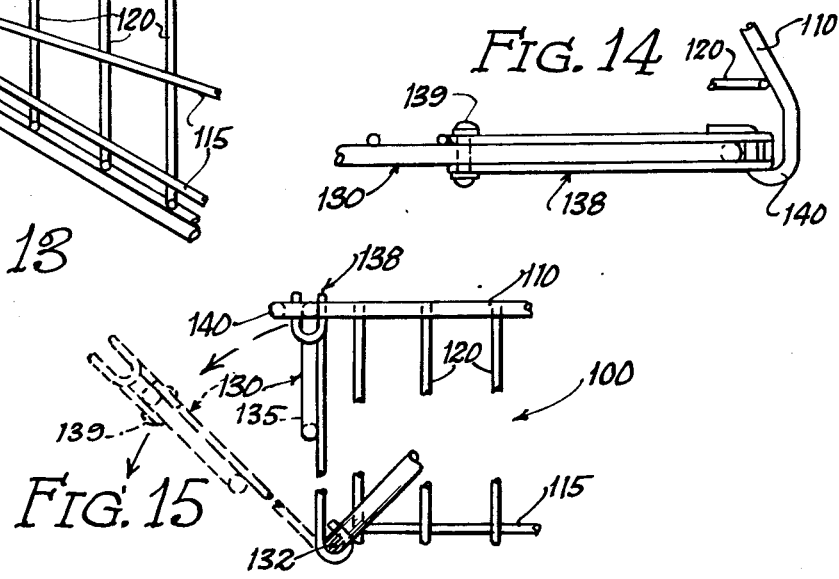

COMBINATION SERVICE TRUCK AND DISPENSING EQUIPMENT

This is a division of my copending application Ser. No. 418,835, filed Nov. 26, 1973 now U.S. Pat. No. 3,957,159, which in turn is a division of my application Ser. No. 240,163, filed Mar. 31, 1972, now issued as U.S. Pat. No. 3,807,788, dated Apr. 30, 1974.

My invention relates to storage and dispensing devices specially suitable for use in connection with Service Trucks and Dispensing Equipment as disclosed in my U.S. Pat. No. 3,807,788 and in my pending patent application Ser. No. 418,835, filed Nov. 26, 1973, of which this is a division. The latter issued as U.S. Pat. No. 3,957,159 on May 18, 1976.

BRIEF OUTLINE OF INVENTION

A principal object of my invention is to provide a storage and dispensing container especially suitable for mounting in a service van or in a stationary environment such as a store, warehouse, etc., and adapted for mass production from inexpensive material such as wire, the contents being exposed to view from outside the container.

Another object is to provide such a container which will have three-point support means extending laterally and rearwardly from the periphery thereof, and will also have a front wall openable for quick access.

A further object is to provide equipment of the type referred to which is specially designed for mass production, of knock down, simple construction which may be packed for shipment in small containers and may be quickly and easily installed and demounted with a minimum of simple tools, which will be rugged and inexpensive.

Various other objects and advantages will become apparent to those skilled in the art as the description proceeds.

BRIEF DESCRIPTION OF THE DRAWINGS

Referring now to the drawings forming a part of this specification and illustrating a preferred embodiment of my invention:

FIG. 1 is a simplified top plan view of a fitted truck body in a preferred embodiment of my invention;

FIG. 2 is a side elevation of said truck, with part of its walls broken away to reveal certain interior equipment;

FIG. 3 is a side elevational view of an embodiment of a rotary storage device constituting a feature of my invention;

FIG. 4 is a fragmentary top plan of said unit;

FIG. 5 is a fragmentary plan-section, as seen substantially along line 5—5 of FIG. 3;

FIG. 5a is a section-elevation along line 5a—5a of FIG. 5;

FIG. 6 is an enlarged fragmentary section-elevation taken substantially along line 6—6 of FIG. 3;

FIG. 8 is a fragmentary elevation-section, enlarged, along line 8—8 of FIG. 5, in container-locking condition;

FIG. 8a is a view similar to FIG. 8, unlocked;

FIG. 9 is a fragmentary elevation seen substantially along line 9—9 of FIG. 8;

FIG. 10 is a similar view seen substantially along line 10—10 of FIG. 8;

FIG. 11 is a similar view seen substantially along line 11—11 of FIG. 4, on an enlarged scale;

FIG. 12 is a similar view seen substantially along line 12—12 of FIG. 11;

FIG. 13 is a fragmentary plan-section substantially along line 13—13 of FIG. 11;

FIG. 14 is a fragmentary plan view seen substantially along line 14—14 of FIG. 12 and FIG. 15 is a fragmentary elevation seen substantially along line 15—15 of FIG. 12.

DETAILED DESCRIPTION

Figure 7:
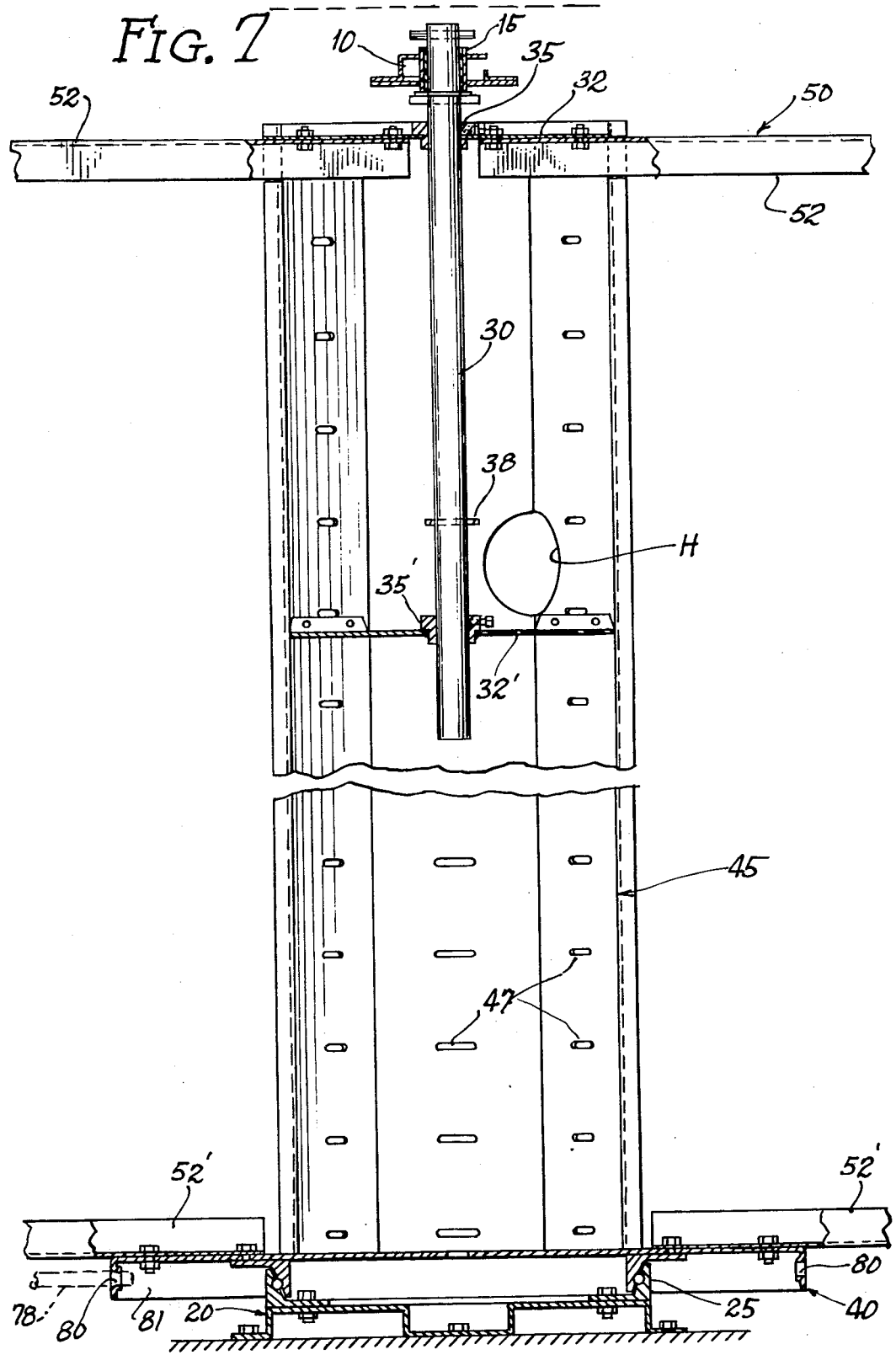
FIG. 7 is an enlarged elevation-section taken substantially along line 7—7 of FIG. 4.

Referring first to FIGS. 1 and 2, my invention contemplates specially equipping a truck body T which may be the body of a standard or modified panel truck designed to facilitate and expedite the functioning of service men, as outlined hereabove. It will be understood that my invention is otherwise applicable, as to the cabin of a nautical vessel, etc. In fact, various aspects of my invention are widely applicable, as in stationary installations, although specially designed for moving vehicles.

Truck body T comprises essentially two main compartments, viz., cab portion C and storage compartment S, said compartments being separated by a bulkhead B, preferably.

Removably mounted in compartment S is a plurality of storage and dispensing units, one of which is a knockdown rotary unit R constituting a major feature of my invention.

Rotary unit R comprises a skeleton frame mounted for rotation on a vertical axis and comprising a plurality of vertical sections, chambers or compartments radially disposed about the axis, each of such sections comprising one or more storage and dispensing receptacles. Said receptacles may vary in character but in any case are removably secured to said frame. The frame is mounted for angular adjustment and locking in any adjusted position to make accessible any desired section.

The storage means in any section may comprise any desired number of baskets, drawers, etc., stacked or vertically spaced and designed for quick and secure attachment to and detachment from the frame.

Rotary Unit

Referring to FIGS. 3-10, inclusive, suitable means is provided for detachably mounting unit R to the floor and ceiling of the truck body. While such mounting means may take a wide variety of forms, in this case I provide a channel like member 10 at the top and another channel like member 20 at the bottom of different configuration. Member 10 seats a suitable journal member 15 for a shaft 30, while member 20 seats a ring bearing indicated generally by numeral 25.

Arranged on shaft 30 are spaced bushings 35, 35' seating a pair of similar polygonal plates 32, 32', in this case hexagonal, although the plates could be circular or of other configuration. Shaft 30 may be provided with a cotter pin or other projection 38 to limit its accidental displacement.

A circular (or otherwise shaped) flanged base plate 40 secured to ring bearing 25 (FIG. 7) serves as a support for a column 45 which may conveniently be formed of a pair of similar sheet members secured together.

Plates 32, 32' are similar to the inside configuration of column 45 and are secured thereto. Said column is provided with peripherally spaced series of vertically spaced means 47 (in this case apertures) for supporting containers to be mounted on and carried by the column. A hand hole H may be provided in column 45 for access to the interior thereof.

Detachably secured to the column 45 is a series of radially extending U-members 50 comprising horizontal arms 52, 52' attached as by screws to upper and lower portions of the column (FIGS. 3a, 5, 7) and a vertical member 53 secured as by welding to arms 52, 52'. A pair of adjacent U-members 50 defines the lateral extremities of a wedge shaped chamber or compartment the inner extremity of which is defined by the column.

Each vertical member 53 has a series of spaced diagonal notches 57 (FIGS. 3, 6, 8-10) which cooperate with a series of vertically elongated notches 57' in a U-bar 59 arranged to slide longitudinally within bar 53. Notches 57 are inclined downwardly and inwardly while notches 57' (FIG. 8a) have a rounded cavity 58 at their upper end to seat a finger F of a container, to be described hereinafter.

A J-shaped pivoted latch L (FIGS. 8, 8a, 9) controls a detent 55 normally retaining the slide bar in unlocked position (FIG. 8a) by engagement in aperture 56. The latch is provided with a weak spring 60 and a strong spring 60' controling said detent.

When the latch is pivoted outwardly (FIG. 8), slide 59 will drop by gravity, assisted by coil spring 62, to locked position (FIGS. 8 and 9). To release a container or a series thereof in a given chamber, latch L is grasped by its outwardly projecting lip and the slide thus lifted, thereafter restoring the latch to the unlocked position (FIG. 8a).

Inwardly projecting bosses 65 limit the upward movement of slide bar 59 while a stop member 67 performs a like function at the lower end. Guide bosses 54 on bar 53 serve to guide and retain slide bar 59.

As seen in FIG. 1, the truck body may have access openings, preferably provided with doors D, at the rear and also adjacent the front of the storage compartment. Accordingly, it is desirable that I provide means for indexing and locking the rotary unit in any selected angular position to provide access to a selected chamber at a most convenient position.

Referring to FIGS. 5, 5a, an angle plate 70 pivotally mounts a U-shaped crank 73 on the truck bed. The crank (FIG. 5) is disposed obliquely to the longitudinal axis of the truck, whereby one arm A is disposed adjacent to a side door, the other arm A' being adjacent to the storage compartment. Crank 73 is connected by a link 75, through a connecting rod 76, to a plunger 78 supported by an apertured U-bar 79. Plunger 78 registers with any one of a series of holes 80 spaced about the periphery of circumferential flange 81 of base plate 40 (FIGS. 3, 5a, 7). A tension spring 85 (FIG. 5a) normally retains plunger 85 in locking engagement with the rotary unit.

From the above description it will be seen that a service man may have convenient access to the rotary unit either from the rear of the truck or from the opening at the side of the storage compartment. In either case he may conveniently make available any desired chamber of the unit after releasing locking means 73 by actuating the more convenient of crank handles A, A' and then rotating the unit to the proper position.

Container for Rotary Unit

While my improved rotary storage unit may carry a wide variety of containers of different designs, I have devised as a part of my invention an improved storage and dispensing basket which is especially advantageous.

Referring to FIGS. 11-15, numeral 100 indicates in general a container embodying my invention. While it may be formed of other materials, I have found plastic coated wire especially suitable as providing maximum visibility of contents as well as protection of fragile items. It is generally triangular or wedge shaped in horizontal configuration, to conform to the radial compartments or chambers of the rotary member. Container 100 may comprise a top rim member 110 to which are attached spaced angular elements 115 forming back and bottom portions. Another series of wires 120 forms the sides and extend across the bottom. A U-shaped member 122 secured to the bottom has a rearwardly extending loop portion 123 engageable in an aperture 47 of column 45 to provide a rear support for the basket.

A transverse wire element 125, which should be of sufficiently heavy gauge to provide adequate support, is secured to and extends across the bottom (FIG. 11), projecting beyond the sides of the basket. The free ends of said wire 125 constitute support fingers F adapted to engage and be locked in notches 57, 57' of bars 53 and 59 and thus provide lateral support for the basket (FIGS. 6, 8, 8a, 9).

Although a lid might be provided, none is shown in this embodiment. Access may be provided from the front, a suitable gate 130 in this case being hingedly attached as at 132. The gate may take any suitable form, preferably having a crossbar 135, and also is provided with suitable latch members 138 on each side hinged as at 139 for clamping engagement with rim member 110, the latter being deformed to form a hook portion 140 to engage latch 138 (FIG. 14).

As seen in FIG. 4, various other types of containers may be carried by the rotary unit. For example, I may provide a tray 100A generally similar in configuration to container 100, to carry small, loose items. It may have a sheet bottom 145 and may have a pivoted gate 130 secured as by a sliding bolt or other suitable lock.

Another form of container mountable on the rotary frame may be a cabinet 150 of outwardly slidable drawers.

All of said containers are preferably detachably secured to the rotary frame as in the case of baskets 100, having finger elements engageable with the vertical bars, also means for detachable connection to the column, providing three point support.

Conclusion

It will be apparent that I have provided an improved combination of a service truck with storage and dispensing devices which will greatly add to the efficiency of a service man. It is estimated that my invention will enable a man to make at least two or three more service calls per day than with equipment now known, effecting substantial economies which will inure to the benefit of the customer.

Various changes coming within the spirit of my invention may suggest themselves to those skilled in the art. Hence, I do not wish to be limited to the specific forms shown or uses mention herein, except to the extent indicated in the appended claims.

I claim:

1. A reticulated wire basket-like container designed to hold a plurality of loose articles, comprising
    a. a bottom portion of crossed wires with an element extending rearwardly beyond the periphery of said bottom portion to provide, when engaged with support means outside the basket, partial support for the latter, b. an elongated member extending transversely across said bottom portion with terminal elements beyond the periphery of both sides thereof to provide, when engaged with support means outside the basket, lateral support for the latter, whereby the basket is provided with three-point support, c. an upper rim portion of relatively heavy wire, d. side and back wire portions secured to said rim and bottom portions, e. a pivoted front portion providing access to the interior of the basket, and f. detachable means latching the front portion.

2. A container as in claim 1, wherein said support elements are formed of wire of exceptionally heavy gauge as compared with the other wires in the basket.

3. A container as in claim 1, which is generally triangular in horizontal contour.

4. A container as in claim 2, which is generally triangular in horizontal contour.

* * * * *